US009701238B2

(12) United States Patent
Di Tanna et al.

(10) Patent No.: US 9,701,238 B2
(45) Date of Patent: Jul. 11, 2017

(54) REGULATION SYSTEM OF THE HEADLIGHTS IN A TILTING VEHICLE WITH ROLL MECHANISM

(75) Inventors: Onorino Di Tanna, Pontedera (IT);
Stefano Bartolozzi, Pontedera (IT);
Mario Santucci, Pontedera (IT);
Lorenzo Nardo, Pontedera (IT)

(73) Assignee: PIAGGIO & C. S.p.A., Pontedera (IT)

( * ) Notice: Subject to any disclaimer, the term of this patent is extended or adjusted under 35 U.S.C. 154(b) by 468 days.

(21) Appl. No.: 14/235,092

(22) PCT Filed: Jul. 31, 2012

(86) PCT No.: PCT/EP2012/064955
§ 371 (c)(1),
(2), (4) Date: Mar. 24, 2014

(87) PCT Pub. No.: WO2013/017594
PCT Pub. Date: Feb. 7, 2013

(65) Prior Publication Data
US 2014/0204598 A1 Jul. 24, 2014

(30) Foreign Application Priority Data
Aug. 1, 2011 (IT) .............................. MI2011A1469

(51) Int. Cl.
*B60Q 1/064* (2006.01)
*B60Q 1/11* (2006.01)
(Continued)

(52) U.S. Cl.
CPC .................. *B60Q 1/11* (2013.01); *B60Q 1/12* (2013.01); *B60Q 1/18* (2013.01); *B62J 6/02* (2013.01);
(Continued)

(58) Field of Classification Search
CPC ... B60Q 1/11; B60Q 1/12; B60Q 1/18; B60Q 2300/136; B60Q 2200/36; B62J 6/02; B62K 5/10
(Continued)

(56) References Cited

U.S. PATENT DOCUMENTS 2,961,254 A * 11/1960 Muller ............... B60G 17/0277
280/124.103
3,697,741 A * 10/1972 Yssel ....................... B60Q 1/11
362/469
(Continued)

FOREIGN PATENT DOCUMENTS

CN 102105317 A 6/2011
DE 10145142 A1 4/2003
(Continued)

OTHER PUBLICATIONS

International Search Report issued in corresponding International Patent Application No. PCT/EP2012/064955 dated Aug. 31, 2012 (10 pages).
(Continued)

*Primary Examiner* — Ali Alavi
(74) *Attorney, Agent, or Firm* — Kilyk & Bowersox P.L.L.C.

(57) ABSTRACT

A regulation system of one or more supports of the domes of the headlights in a vehicle having a chassis, a rear wheel, at least one front steering wheel and a roll and steering mechanism operatively connected with the chassis is described. The regulation system comprises articulated connection means between the roll and steering mechanism and the supports for controlling the domes of such headlights so that they rotate such to compensate the roll rotation of the vehicle while driving.

16 Claims, 11 Drawing Sheets

(51) Int. Cl.
*B60Q 1/12* (2006.01)
*B62J 6/02* (2006.01)
*B62K 5/10* (2013.01)
*B60Q 1/18* (2006.01)

(52) U.S. Cl.
CPC ............ *B62K 5/10* (2013.01); *B60Q 2200/36* (2013.01); *B60Q 2300/136* (2013.01)

(58) Field of Classification Search
USPC .................... 362/37, 460, 43–45, 48, 475
See application file for complete search history.

(56) References Cited

U.S. PATENT DOCUMENTS

| | | | | |
|---|---|---|---|---|
| 4,225,902 | A * | 9/1980 | Ishikawa | B60Q 1/076 362/40 |
| 5,954,428 | A | 9/1999 | Eichhorn et al. | |
| 6,767,119 | B2 * | 7/2004 | Tseng | B60Q 1/12 362/37 |
| 7,500,772 | B1 * | 3/2009 | Lebel | B60Q 1/12 362/525 |
| 7,571,787 | B2 * | 8/2009 | Saiki | B60G 7/00 180/210 |
| 8,380,391 | B2 * | 2/2013 | Baino | B62J 6/02 362/37 |
| 2008/0112174 | A1 * | 5/2008 | Nakano | B60Q 1/12 362/466 |
| 2008/0198617 | A1 * | 8/2008 | Schwab | B60Q 1/076 362/545 |
| 2010/0168966 | A1 * | 7/2010 | Tsujii | B60Q 1/12 701/48 |
| 2013/0148369 | A1 | 6/2013 | Haest | |

FOREIGN PATENT DOCUMENTS

| | | |
|---|---|---|
| EP | 0833099 A2 | 4/1998 |
| EP | 1645466 A1 | 4/2006 |
| EP | 1942049 | 7/2008 |
| EP | 2204312 A1 | 7/2010 |
| GB | 09555 A | 0/1913 |
| GB | 316738 A | 8/1929 |
| GB | 400566 | 10/1933 |
| JP | S63-124578 U | 8/1988 |
| JP | H05-000637 A | 1/1993 |
| JP | 2001347977 A | 12/2001 |
| JP | 2006131212 A | 5/2006 |
| JP | 2007146997 A | 6/2007 |
| NO | 2012022658 A1 | 2/2012 |
| WO | 2010004017 A2 | 1/2010 |

OTHER PUBLICATIONS

Search Report issued in corresponding Chinese Patent Application No. 2012800382823 dated Jun. 15, 2015 (2 pages).
Search Report issued in corresponding Taiwan Patent Application No. 101127596 dated Aug. 13, 2016 (in English) (1 page).
Office Action (Summary) issued in corresponding Japanese Patent Application No. 2014-523305 (in English) (2 pages).
Search Report issued in corresponding European Patent Application No. 15164523 dated Aug. 19, 2015 (2 pages).

* cited by examiner

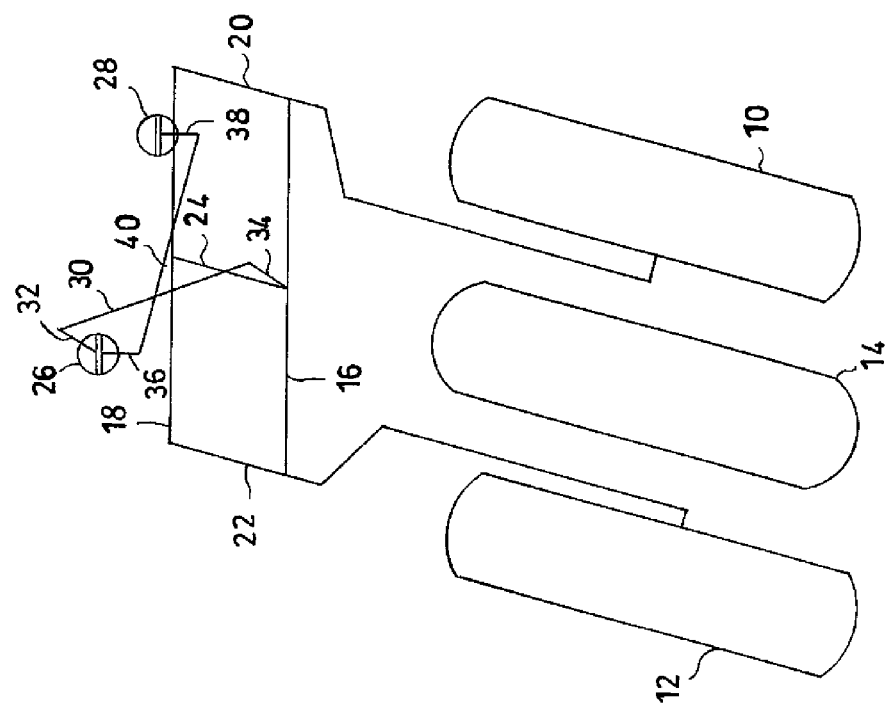
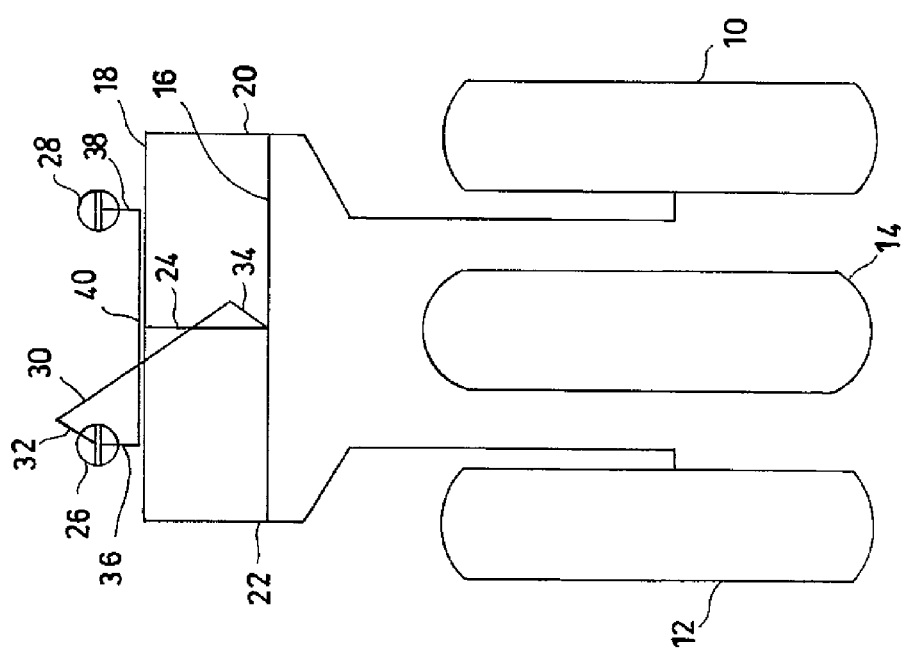

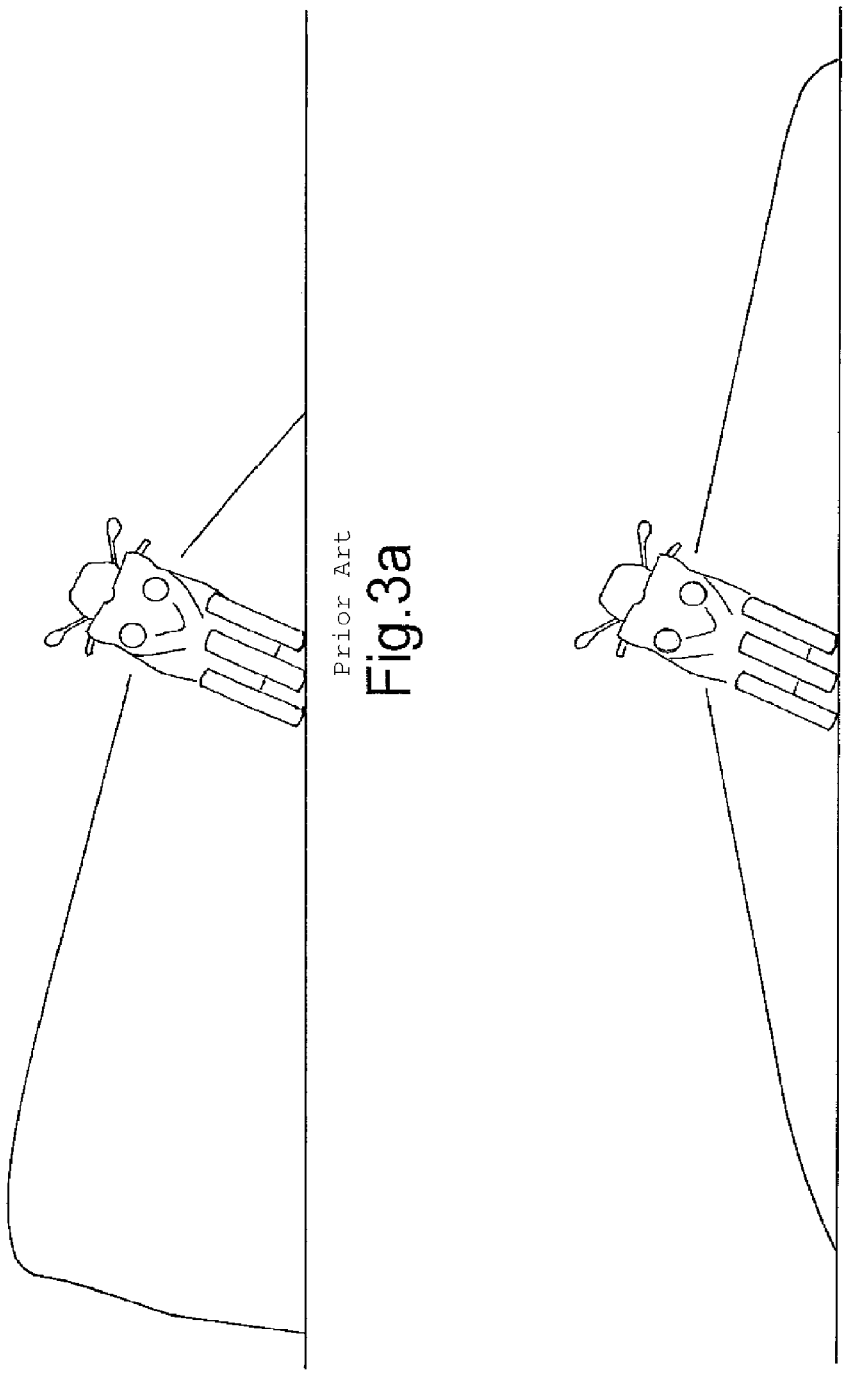

US 9,701,238 B2

REGULATION SYSTEM OF THE HEADLIGHTS IN A TILTING VEHICLE WITH ROLL MECHANISM

This application is a National Stage Application of PCT/EP2012/064955, filed Jul. 31, 2012, which claims priority to Italian Patent Application No. MI2011A001469, filed Aug. 1, 2011.

FIELD OF THE INVENTION

The present invention relates to a regulation system of the headlights in a vehicle, in particular a tilting motor vehicle with three or four wheels having a roll mechanism.

BACKGROUND OF THE INVENTION

Typically, the entire headlight of a motor cycle is integrally connected with the bodywork or the handle bar of the vehicle. When the vehicle is moving, the elements of the headlight cannot move. Exceptions are some regulations of a limited extent however possible only when the vehicle is stationary and anyhow not related to the dynamic conditions of the vehicle itself.

As it is known, in conditions of rectilinear driving, the light beam of the headlights is more extended in the horizontal direction, and, especially in the low beam configuration, it is greatly limited in its height for not disturbing the vehicles coming from the opposite direction. For the reasons set forth above, the portion of the road that is effectively illuminated is strongly influenced by the driving maneuvers. The roll angle that is necessary to the tilting vehicles to drive in a curve causes the displacement of the illuminated area externally to the trajectory, thus limiting the visibility in the driving direction.

In several tilting vehicles, in particular those with double front wheel, such as the leaning tricycle "MP3" manufactured by Piaggio, a mechanism that allows producing the roll of the vehicle in a cornering behavior has connecting elements that are substantially parallel to the ground in all driving conditions.

SUMMARY OF THE INVENTION

Therefore, the object of the present invention is to implement a regulation system of the headlights in a vehicle, in particular a tilting motor vehicle with three or four wheels having a roll mechanism, which is able to exploit the above-mentioned connecting elements for limiting the variation of the incidence angle of the light beam with the road independently from the roll angle of the vehicle, so as not to decrease the illumination in the area where the vehicle is moving.

Another object of the invention is to implement a regulation system of the headlights for tilting vehicles that can be implemented with a reduced number of components of a simply mechanical assembling and without the aid of actuators/electronic sensors, making with the rotation of the domes of the lights integral with that of the roll mechanism with respect to the chassis.

A further object of the invention is to implement a regulation system of the headlights for tilting vehicles the efficiency of which can be increased by adding a series of additional lights, having a light beam suitably oriented and actuatable through switches able to detect the rotation of the roll mechanism and/or the handle bar of the vehicle with respect to the chassis.

Still another object of the invention is to implement a regulation system of the headlights that is applicable also to the conventional two-wheel motor cycles, by using a set of sensors suitable to detect the roll angle of the vehicle and an electrical motor performing the suitable rotation of the domes of the lights.

These objects according to the present invention are achieved by implementing a regulation system of the headlights in a vehicle, in particular a tilting motor vehicle with three, or four wheels, having a roll mechanism, as set forth in claim 1.

Further characteristics of the invention are highlighted in the dependant claims, which are an integral part of the present description.

BRIEF DESCRIPTION OF THE DRAWINGS

The characteristics and advantages of a regulation system of the headlights in a vehicle, in particular a tilting motor vehicle with three or four wheels having a roll mechanism, according to the present invention will be more clearly apparent from the following description, given by way of non-limiting example, with reference to the annexed schematic drawings, in which:

FIG. 1a is a schematic view showing, under rectilinear driving conditions, the kinematic pattern of a three-wheel tilting vehicle having a regulation system of the headlights according to the invention;

FIG. 1b is a schematic view showing, under cornering behaviour conditions, the same kinematic pattern of FIG. 1;

FIGS. 3a and 3b represent, in a rear view, the same situations of FIG. 2a and FIG. 2b, respectively;

DETAILED DESCRIPTION OF THE INVENTION

Figure 2B:
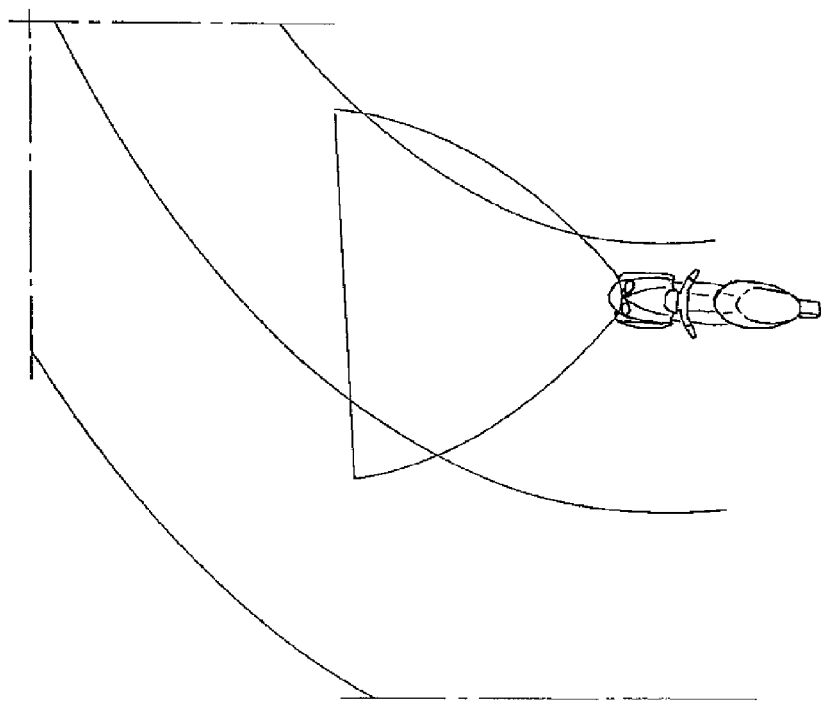
FIG. 2b is a top view of the illuminated areas in a cornering behaviour by a tilting vehicle having a regulation system of the headlights according to the invention, in which it is highlighted how the illumination is suitably limited to the lane to which the vehicle belongs, and also the inside of the bend is well visible.

With reference to FIGS. 1a and 1b, a functional scheme for the regulation system of the headlights according to the invention is shown, applied to a general three-wheel tilting vehicle, with two front steering wheels 10 and 12. In particular, two transversal lower and upper roll arms are highlighted, represented by the segments 16 and 18, respectively, and two right and left symmetrical steering arms, represented by the segments 20 and 22, respectively, forming the roll and steering mechanism operatively connected with the chassis, partially represented by the vertical segment 24.

By inserting on each of the intersections of the above-mentioned segment a corresponding cylindrical hinge with an axis parallel and substantially orthogonal to the plane of the Figure, so as to connect together the single pairs of segments, a system of vehicle tilting on the two front wheels 10 and 12 and the rear wheel 14 is implemented, respectively connected with hinges that are orthogonal at their mid plane to the segments 16, 18, and 24. As set forth in the rolled configuration of the vehicle, reported in FIG. 1b, the transversal roll arms 16 and 18 are constantly parallel to the ground. Such unique feature can be advantageously exploited to control, through a system of levers, the domes 26' and 28' of the supports 26 and 28 of the headlights so that they rotate such as to compensate the roll rotation of the vehicle while driving.

In particular, the regulation system of the headlights 26, 26' and 28, 28' comprises a arm 30 articulated through two spherical hinges with respect to the lower roll arm 16 and with respect to an upper lever 32 integral with the dome 26' of a first headlight. In turn, the dome 26' of such first headlight is detached with respect to the chassis 24 in its rotation with respect to an axis substantially oriented in the driving direction of the vehicle.

Between the arm 30 and the lower roll arm 16, a further lower lever 34 is provided. In the case where, as shown in the scheme of FIGS. 1a and 1b, the upper 32 and lower 34 levers are parallel and have the same length, the headlight dome 26' will rotate exactly of the same angle as the upper roll arm 18, while maintaining the ideal incidence conditions of the light beam it produces also in conditions of a rolled vehicle in a bending behaviour.

Each dome 26' and 28' of the headlights is further made integral with a corresponding lever 36 and 38. Such levers 36 and 38 are connected, through spherical hinges, with a tie-push rod represented by the segment 40. In this manner, the movement impressed to the dome 26' of the headlight is transmitted also on the dome 28' of the other headlight. Such a movement is the same for both headlights 26, 26' and 28, 28' in the case where the respective levers 36 and 38 are parallel and have the same length.

Figure 2A:
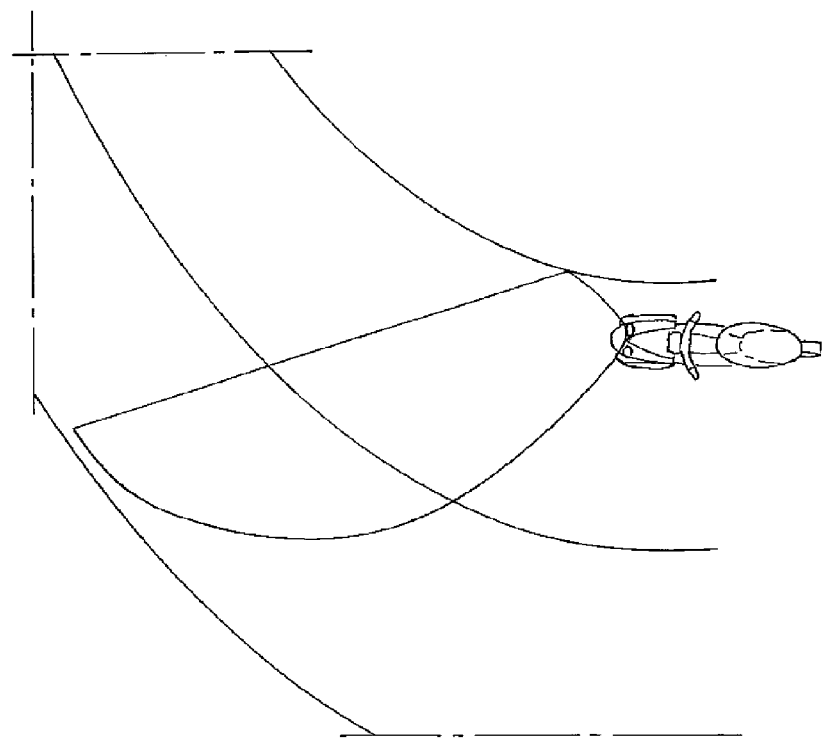
FIG. 2a is a top view of the illuminated areas in a cornering behaviour by a tilting vehicle having a conventional light set, while it is driving the trajectory with a roll angle equal to 25 degrees, in which it is highlighted how the light beam is completely displaced towards the opposite lane and is totally free from illumination of the area inside the bend.

Such a regulation system of the headlights, adaptable to the roll of the vehicle, allows obviating the condition illustrated in FIGS. 2a and 3a. Due to the bending angle necessary to the vehicle for driving in a bend, in fact, the light beam of a conventional light tends to illuminate areas of the road that are considerably more further ahead and, moreover, displaced towards the lane opposite to that occupied by the vehicle. This has the double negative effect of reducing the visibility inwards of the driven bend and causing the dazzling of possible oncoming vehicles, as well illustrated in FIG. 2a.

On the contrary, as well illustrated by the FIGS. 2b and 3b, the regulation system of the headlights of the present invention allows maintaining the illumination conditions of the road substantially unaltered for any roll angle, thus ensuring an optimal visibility also inwards the bend, and maintaining the light beam within the lane that the vehicle occupies.

Figure 4:
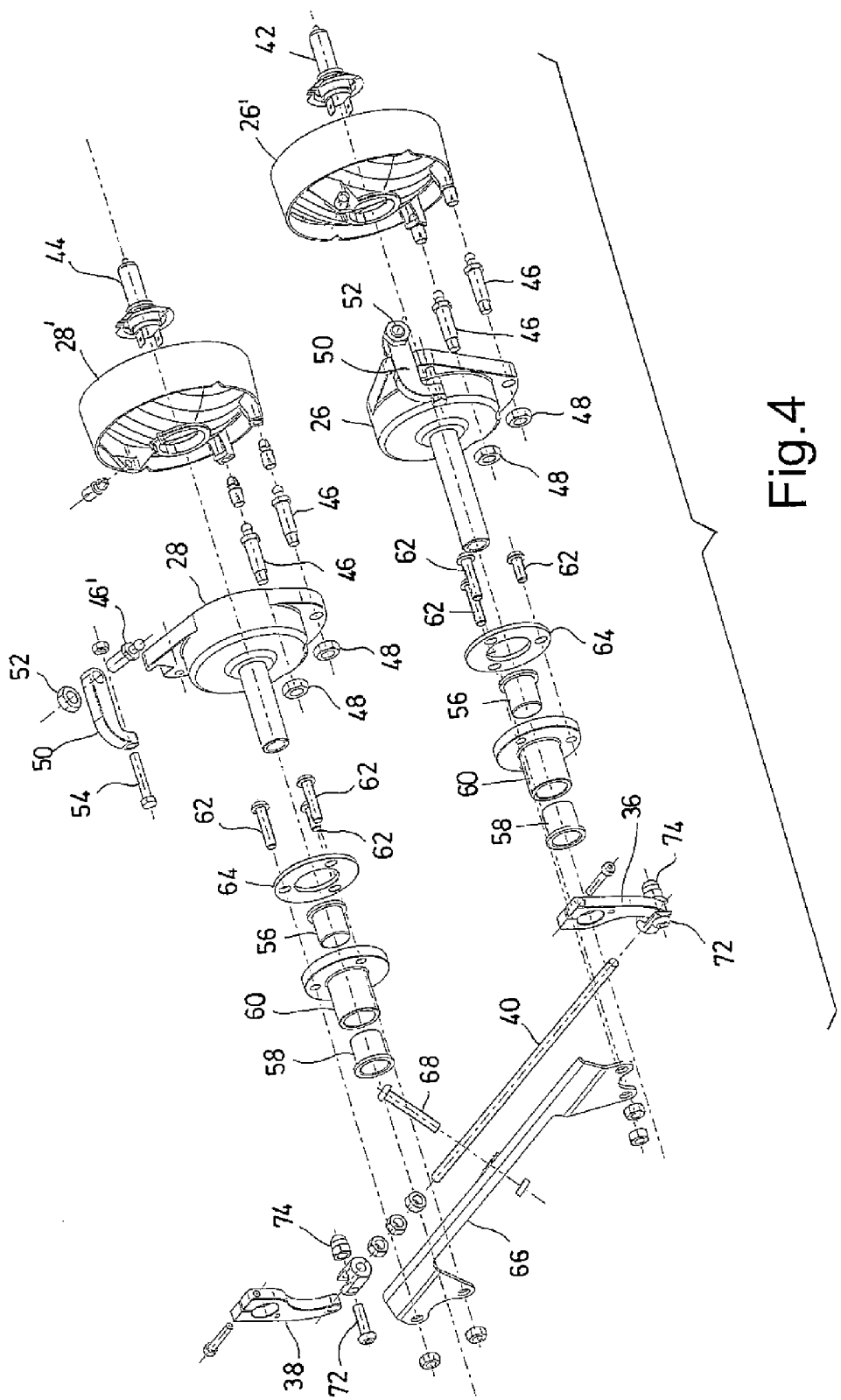
FIG. 4 shows an exploded view of an exemplary embodiment of a regulation system of the headlights according to the invention, with the domes of the lights free to rotate around their lamp axis.

In FIG. 4 an exploded view of a possible implementation of the regulation system of the headlights of the present invention is shown. In particular, the domes 26' and 28' are highlighted, including respective lamps 42 and 44, each being connected to the supports 26 and 28 by inserting as many spherical screws 46 and 46' as necessary into special projections for the regulation of the convergence and depth of the light beams. The four spherical lower screws 46 fit in as many holes, obtained on the supports 26 and 28 (symmetrical right and left) and are locked by corresponding nuts 48. The two upper spherical screws 46' engage on two regulation levers 50 symmetrically mounted on the outer side of each headlight 26, 26' and 28, 28' and are locked thereon by corresponding nuts 52.

Further screws 54 engage both on the supports 26 and 28 and the regulation levers 50, and are locked to the same adjustment levers 50 by approaching the corresponding nuts. The variation of the relative position of the spherical screws 46 and 46' of each side, through the variation of the number of threads gripping on the same spherical screws 46 and 46' or the further screws 54, allows the height and convergence regulation of the lights, as occurs in the conventional solutions.

The rear cylindrical ends of the supports 26 and 28 are rotationally supported by the internal surfaces of a pair of bushes 56 and 58, in turn, housed inside supports 60 symmetrically mounted on the right and left side of the vehicle. Such supports 60 are bound to the chassis 24 of the vehicle through screws 62, which implement the coupling by clamping a plastic counter-shield (not shown), or a suitable surface connected with the chassis 25, between the plates 64 (identical right and left, mounted symmetrically) and the supports 60 themselves, in which the screws 62 engage.

A further transversal reinforcement plate 66 can be connected, through special nuts, with the supports 60 to prevent possible deformations of the regulation system, moreover in the case where it is bound to a plastic structure, which is often present on the vehicles of the scooter type.

Optionally, a screw 68 can provide an additional connecting point between the transversal reinforcement plate 66 and a component of the chassis 24 in order to reinforce the structure.

On the rear cylindrical ends of the supports 26 and 28, therefore, the two identical levers 36 and 38 are symmetrically mounted, through clamps, connected together by the tie-push rod 40, which is suitably threaded at its respective ends, on which two fork-shaped terminals 70 are connected. In the holes obtained on the fork-shaped terminals 70 and the levers 36 and 38, respective screws 72 fit, which act as an axis for their relative rotation, and the corresponding blind nuts 74 allows for the closure of the coupling, while maintaining a suitable clearance that allows the relative rotation of the components.

The parallelism of the levers 36 and 38, besides the same length thereof, allows having rotations with the same angle of both right and left domes 26' and 28'. By suitably varying the number of threads with which the tie-push rod 40 engages on the fork-shaped terminals 70, it is possible to perform small regulations of the relative position of the two domes 26' and 28'.

The so-described regulation system of the headlights allows implementing a pair of symmetrical lights, the domes of which are free to rotate around an axis substantially parallel to the driving direction of the vehicle. In the case where such a system is employed on a three-wheel tilting vehicle, it is possible to implement the rolling drive of the domes in various ways as described below.

Figure 5:
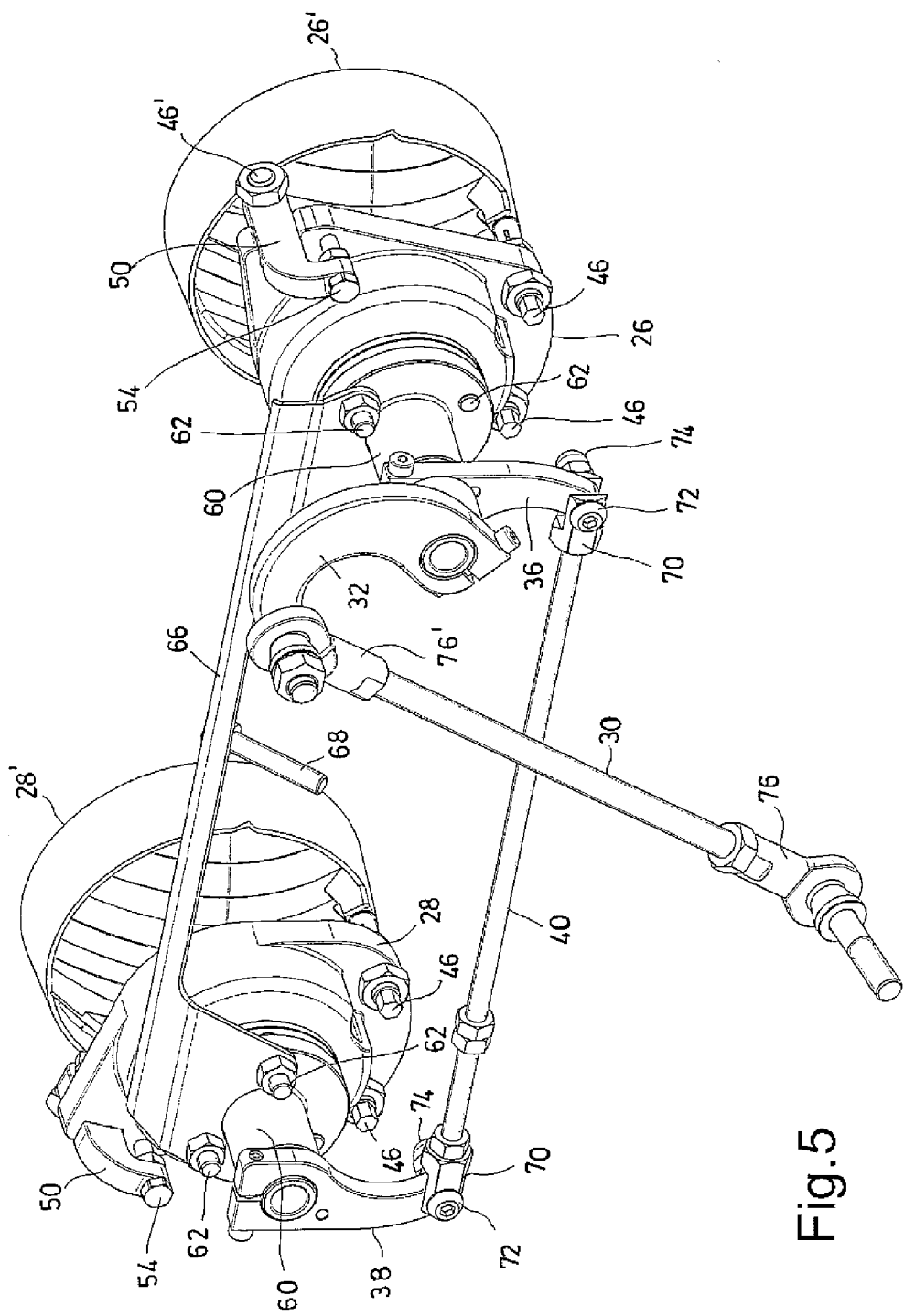
FIGS. 5 and 6 show in a front side view and a rear side view, respectively, the regulation system of the headlights of FIG. 4, applied to a three-wheel tilting vehicle with driving performed through a return rod, in which in FIG. 5 the system is represented for a roll of the vehicle equal to 25 degrees.
Figure 6:
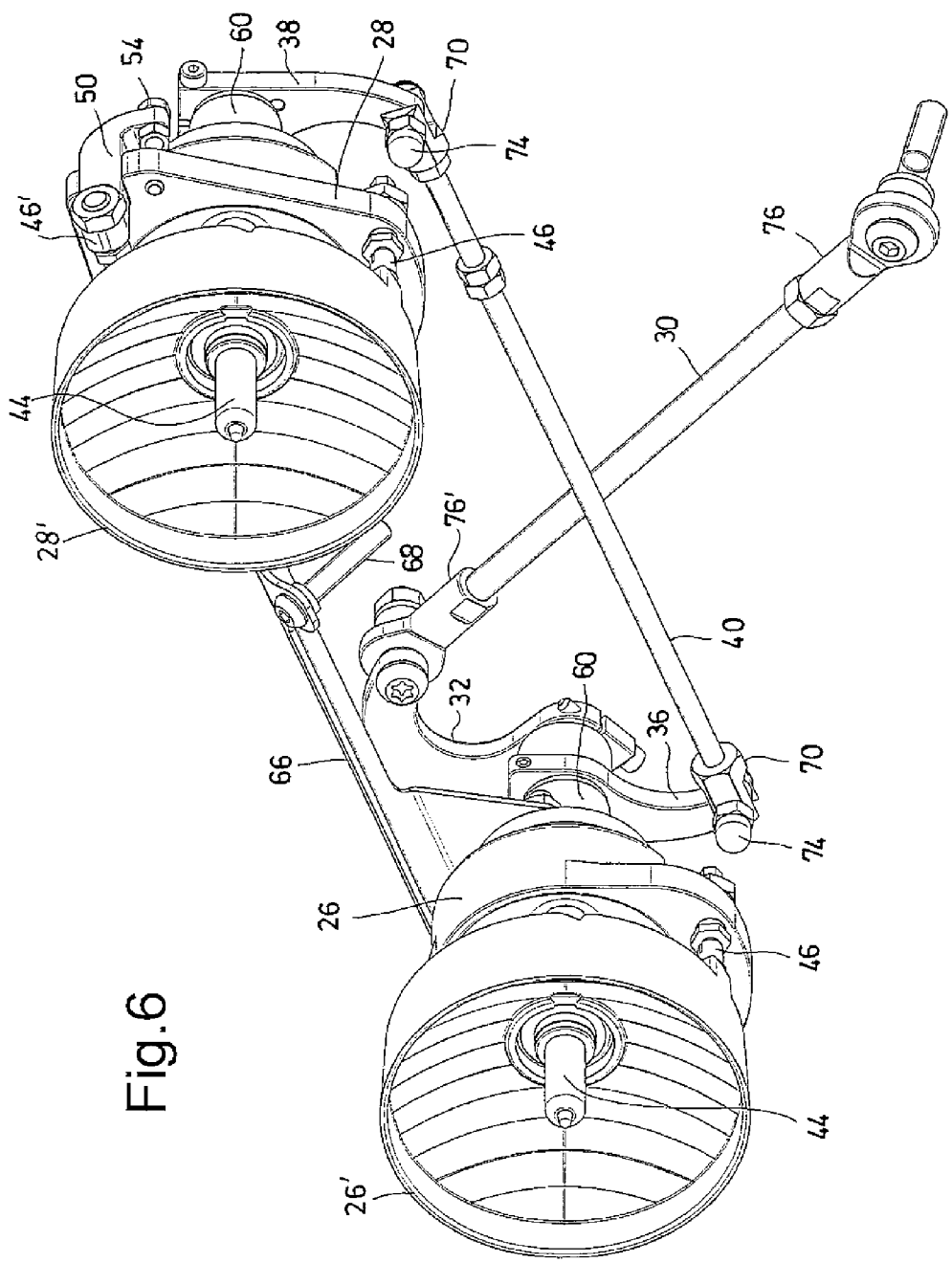
Figure 7:
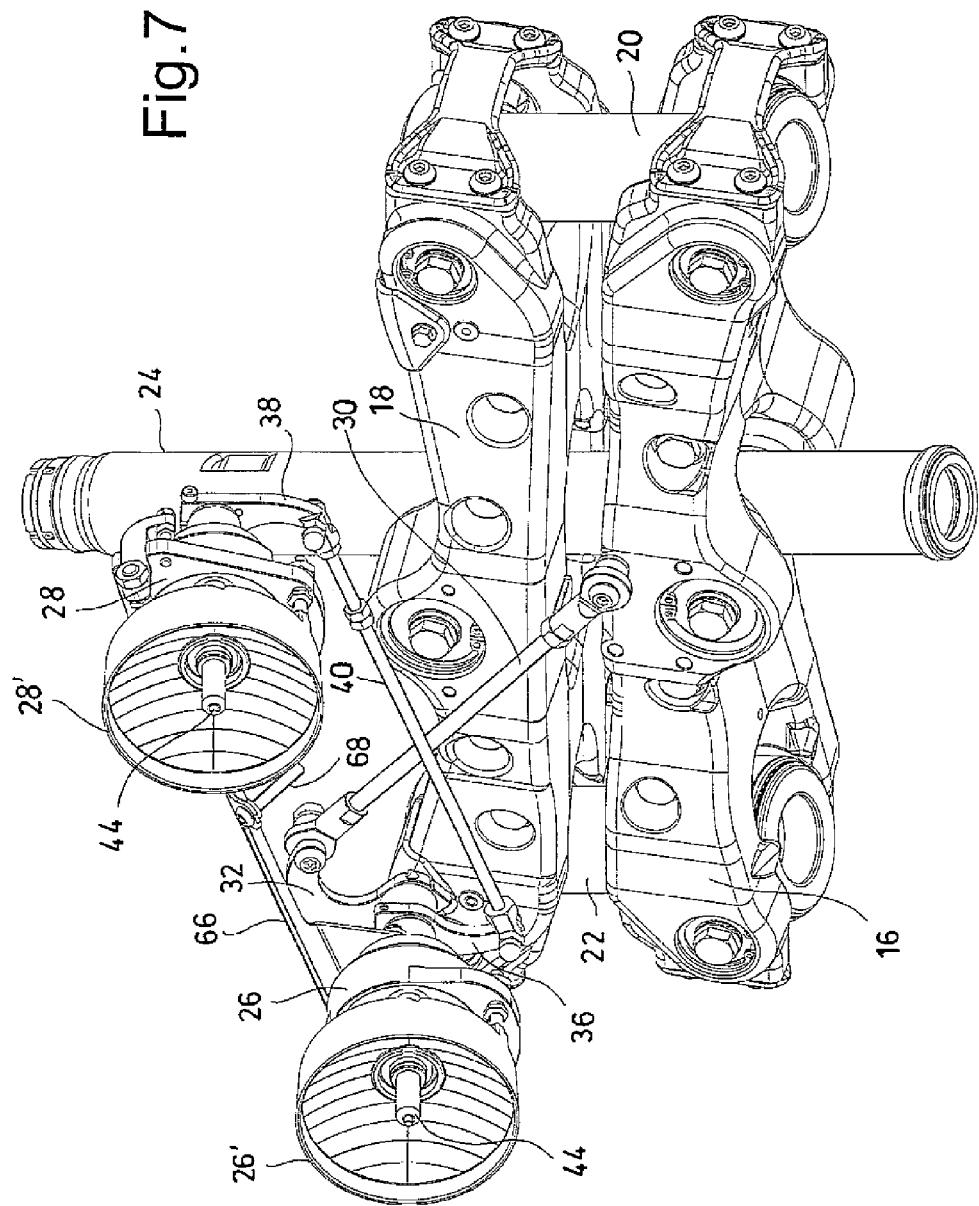
FIG. 7 illustrates the regulation system of the headlights of the FIGS. 4-6, mounted on the transversal roll arms of a three-wheel tilting vehicle.

In FIGS. 5 and 6, a mechanical unit is illustrated, which accurately replicates the kinematic pattern of FIG. 1a. The arm 30, suitably threaded at the respective ends and having on such ends two spherical articulations 76 and 76', is connected in its upper part with the upper lever 32, integral through a clamp with the support 26, and is connected in its lower part with the lower roll arm 16 (as illustrated in FIG. 7).

The segment identified by the projection on a vertical plane of the rotational axis of the central hinge 25 of the lower roll arm 16 and by the centre of the lower spherical articulation 76 of the arm 30 is suitably parallel to the segment identified by the projection on the same vertical plane of the axis of the support 26 and the centre of the upper spherical articulation 76'. Such segments, in the kinematic pattern of FIG. 1a, correspond respectively to the lower 34 and upper 32 segments (levers). In such a manner, unless aligning errors compensated by the spherical articulations 76 and 76' are present, the rotation of the support 26, therefore of the other support 28 connected therewith through the tie-push rod 40, is identical to that of the lower roll arm 16, implementing in a merely mechanical manner the object of the invention in question.

Figure 8:
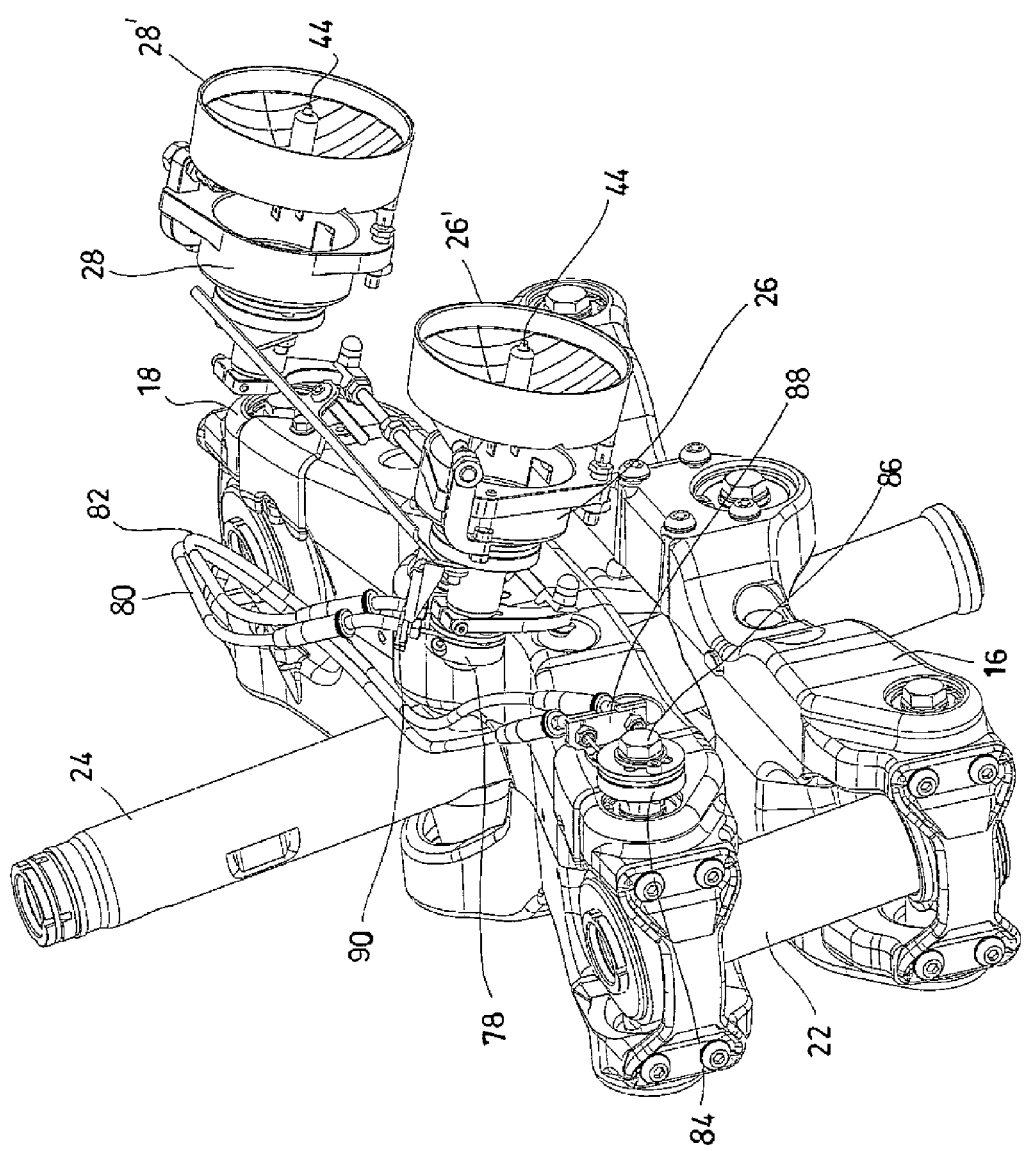
FIG. 8 shows an alternative exemplary embodiment of the regulation system of the headlights according to the invention, in which pulleys and cables with sheath are used.

Similarly, according to what has been illustrated in FIG. 8, the same object can be achieved by replacing the upper lever 32 with a pulley 78 integral with the support 26. The first ends of two Bowden cables 80 and 82 are connected with the pulley 78, which implement a control of the push-pull type, completely similar to that of a drive for a throttle body. A second pulley 84, identical to the pervious one, is connected through a screw 86 to the inner ring of the side bearing of the upper roll arm 18 and has connected therewith the remaining ends of the two Bowden cables 80 and 82. The plates 88 and 90, respectively integral with the upper roll arm 18 and the chassis 24 of the vehicle (or the reinforcing plate 66), act as a stop for the four terminals of the Bowden cables 80 and 82. In this manner, the rotation of the second pulley 84, caused by the movement of the upper roll arm 18, is retuned in an identical manner on the first pulley 78 controlling the movement of the support 26, and therefore of the other support 28 connected therewith by the tie-push rod 40, thus performing the complete compensation of the roll of the vehicle on the domes 26' and 28' of the headlights.

Figure 9:
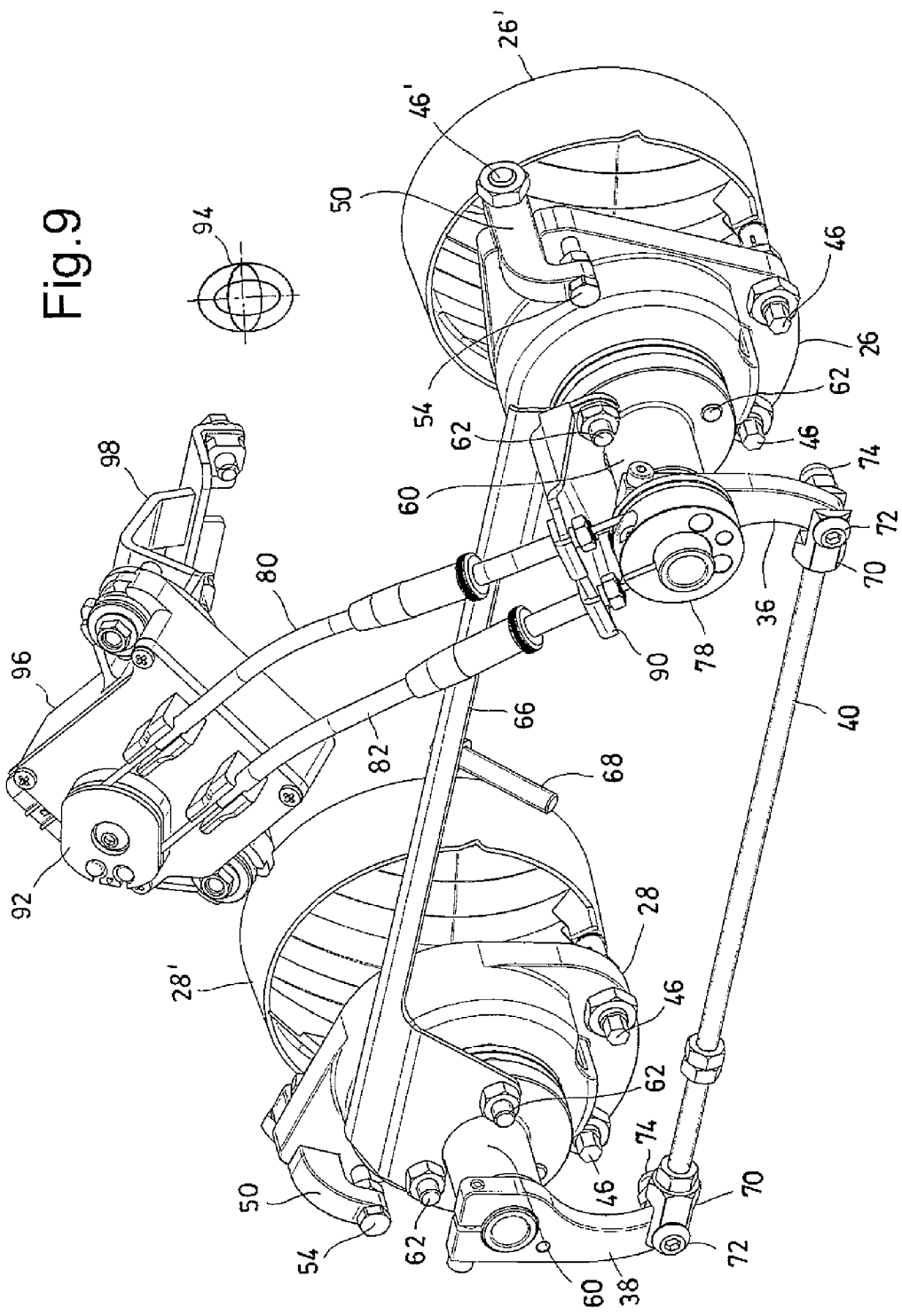
FIG. 9 shows a further alternative exemplary embodiment of the regulation system of the headlights according to the invention, in which an electronically controlled gearmotor is used.

A further embodiment of the regulation system according to the invention, as illustrated in FIG. 9, cab be implemented by using an electrical gearmotor 96, provided with electronic rotation control, on the output axis of which a pulley 92 is mounted, which is completely similar to the second pulley 84 employed in the exemplary embodiment described before. The electrical gearmotor 96 is bound to the chassis 24 of the vehicle through a suitable fixing bracket 98. The two Bowden cables 80 and 82, the ends of which are connected to the pulleys 78 and 92, transmit the movement of the output axis of the electrical gearmotor 96 to the support 26, therefore to the other support 28 connected therewith through the tie-push rod 40, in a manner that is similar to what has been described for the previous embodiments.

The rotation of the electrical gearmotor 96 is controlled by a control system able to detect the roll angle of the vehicle through the reading of the output of an angular sensor (not shown), which detects the relative rotation of at least one of the lower 16 and upper 18 roll arms. Such a rotation, on a plane road, exactly corresponds to the bending angle of the three-wheel tilting vehicle: consequently, the signal detected by the rotation sensor allows performing in an efficient manner a compensation of the roll itself by actuating the electrical gearmotor 96 so that it rotates in an opposite direction by the same extent.

This latter exemplary embodiment of the invention can be suitably employed also on the conventional two-wheel vehicles, provided that a suitable set of sensors able to estimate with a sufficient approximation the roll angle in a bending behaviour is provided on the motor cycle. An efficient method to perform such an estimate with a reduced number of measurement tools is to mount at least one gyroscope 94 on the vehicle, the axis of which is integral with the vertical axis of the vehicle itself, in order to measure the angular velocity of the chassis 24 of the vehicle, and at least one sensor of the velocity of the wheel (phonic wheel).

By assuming (and to the aims of the invention, such an assumption is true) the gyroscopic effects as negligible, and the tires of the vehicle as lenticular, between the various dynamic and kinematic quantities of the vehicle, the following relationships exist:

$$V\omega_z = \frac{g\sin(\theta)}{\cos(\theta)} \quad (1)$$

$$\omega_z = \frac{\hat{\omega}_z}{\cos(\theta)} \quad (2)$$

Whereby, by substituting the function (2) in the function (1), it is obtained:

$$\theta = \arcsin\frac{V\hat{\omega}_z}{g} \quad (3)$$

in which:
V is the feeding velocity of the vehicle as read by the phonic wheel;
g is the gravity acceleration;
$\hat{\omega}_z$ is the angular velocity as read by the gyroscopic sensor with respect to a vertical axis integral with the vehicle;
$\omega_z$ is the angular velocity of the vehicle with respect to a fixed vertical axis; and
$\theta$ is the roll angle of the vehicle.

Through an electronic unit acquiring the signals of the described sensors, therefore, it is possible, through the illustrated relationships, to calculate in a sufficiently accurate manner the roll angle of the vehicle starting from a limited number of measurements. In particular, the sensor of velocity is already present on most of vehicles to report the indications on the speedometer. To avoid possible failures, a redundancy at least on the speed sensor could be provided, comparing the information coming from a sensor installed on the front wheel and the indications coming from an additional sensor on the rear wheel.

Possible drifts in the reading of the gyroscopic sensor 94 can be efficiently compensated by zeroing the reading thereof when the wheel sensor, or both wheel velocity sensors in the case there is a redundancy, indicate a null velocity for more than a determined time range (few seconds). In fact, in such a case it is impossible, under standard conditions, that the vehicle chassis has an angular velocity with respect to its own vertical axis.

Alternatively to the sensors illustrated heretofore, other sets of sensors (complete inertial platforms, accelerometers, etc.) can be suitably used, to calculate within an electronic unit the roll angle of the vehicle according to the requirements of the prior art. Therefore, the roll angle calculated inside the unit can be used, such as in the case of the three-wheel tilting vehicle, to move the domes of the lights, or optionally a single dome in the case where the vehicle has only one light source, of a two-wheel vehicle that has to maintain its attitude with respect to the road plane according to the objects of the present invention.

In order to further increase the visibility of the areas inside the bend, it is possible to mount additional suitably angled headlights 100, which are alternately turned on in case of great bending or steering angles of the vehicle. Therefore, the actuation of the additional headlights 100 placed on the right side of the vehicle will take place in the case of roll angles towards the right that are greater than a predefined threshold, and/or for steering angles greater than a further threshold (for example, 10 degrees). The actuation of the additional headlights 100 placed on the left side of the vehicle will take place in a similar manner.

Figure 10:
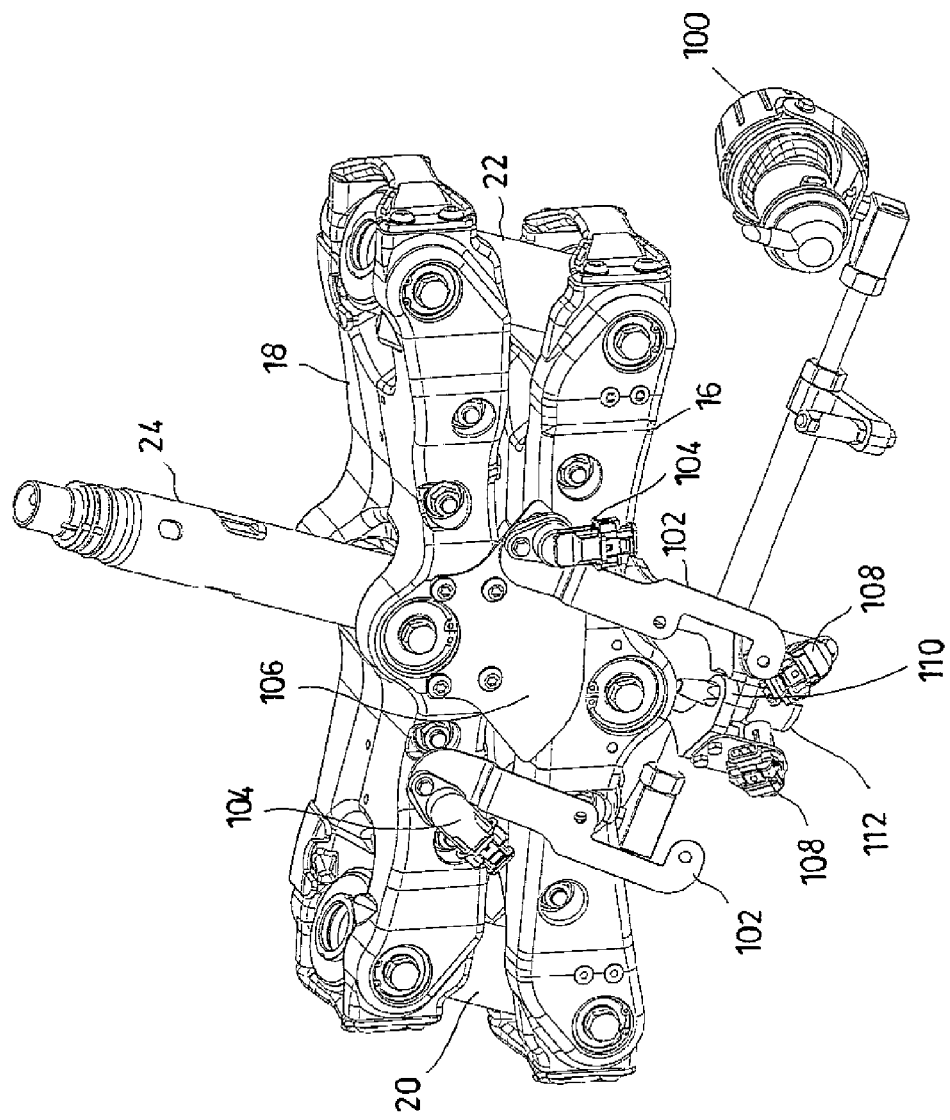
FIGS. 10 and 11 show an actuation system of suitable additional headlights, actuatable in a cornering behaviour based on the rotation of the roll arms of a three-wheel tilting vehicle and/or the rotation of the steering axis through magnetic sensors and metal sectors.
Figure 11:
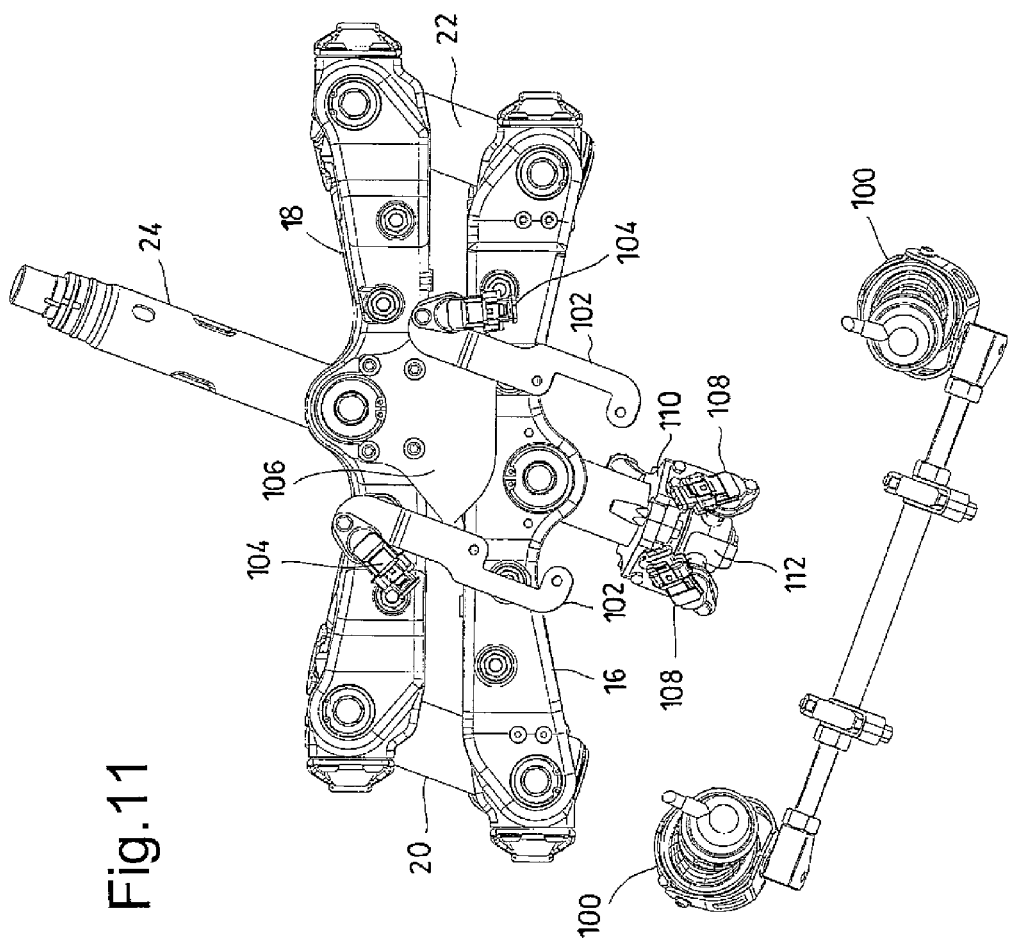

According to the type of vehicle and the means used to estimate the roll angle, it is possible to use several ways to actuate the additional headlights 100 as a function of the tilting angle in a bending behaviour:

1) in case of a three-wheel tilting vehicle, it is possible to secure to the chassis 24, through support brackets 102, two sensors 104 (as those commonly used to read phonic wheels) that react to the proximity with metal elements and, as represented in FIGS. 10 and 11, to constrain to one of the transversal roll arms 16 and 18 a metal sector 106 having such a shape as to be perceived by the two sensors 104 just for bending angles of the vehicle greater than a predefined threshold;
2) in the case where the bending angle of the three-wheel tilting vehicle is estimated starting from an angular potentiometer reading the rotation of one of the roll arms 16 or 18 with respect to the chassis 24, such information can be acquired through a electronic unit controlling the turning on of the additional headlights when such a rotation exceeds the predetermined threshold;
3) in case of conventional two-wheel vehicles, where the bending angle is estimated through a suitable combination of sensors, as described before, the turning on of the additional headlights 100 is controlled by a unit, similarly to what has been just described.

Alternatively or in addition, a metal sector 112 can be provided to be connected with the steering axis of the vehicle, for example by using an expander or a clamp. By suitably positioning two further sensors 108, integral with the steering tube of the chassis 24 through a clamp 110 and relative brackets, it is possible to make so that such further sensors 108 detect the presence of the metal sector 112 just for steering angles of the vehicle greater than a predefined angle, by turning the corresponding additional headlight 100 on. This latter actuation method can be suitably used also on conventional two-wheel vehicles.

Therefore, it has been seen that the regulation system of the headlights in a vehicle according to the present invention achieves the objects outlined above. The regulation system of the headlights in a thus-devised vehicle of the present invention is anyhow susceptible of a number of modifications and variations, all falling within the same inventive concept; furthermore, all the details can be replaced by technically equivalent elements. In practice, the materials used, as well as the shapes and dimensions, will able to be any, according to the technical needs. Therefore, the protection scope of the invention is defined by the annexed claims.

The invention claimed is:

1. A regulation system of one or more supports of a plurality of domes of headlights in a vehicle having a chassis, a rear wheel, at least one front steering wheel, and a roll and steering mechanism operatively connected with the chassis,
   wherein the system comprises articulated connection means between the roll and steering mechanism and the supports for controlling the domes of said headlights so that the headlights rotate such to compensate the roll rotation of the vehicle while driving,
   wherein said articulated connection means comprise an arm articulated through two spherical hinges with respect to the roll and steering mechanism and with respect to an upper lever integral with the dome connected with a first support, said dome of the first support being detached with respect to the chassis in the rotation of the dome with respect to an axis substantially oriented in the driving direction of the vehicle,
   wherein the system comprises a connection mechanism between said dome connected with a first support and the dome of a second support, so that the movement impressed by said articulated connection means to said dome of the first support is also transmitted on said dome of the second support,
   wherein said connection mechanism comprises a tie-push rod connected, through spherical hinges, with two levers respectively integral with said dome of the first support and with said dome of the second support, and
   wherein said first and second support are provided with rear cylindrical ends pivotally supported to the internal surfaces of a pair of bushes, in turn housed inside supports symmetrically mounted on the right and left side of the vehicle and bound to the chassis of said vehicle.

2. System according to claim 1, wherein said two levers are mutually parallel and have the same length, so permitting rotations of the same angle of both domes.

3. The system according to claim 1, wherein between the arm and the roll and steering mechanism, a further lower lever is provided, which is parallel and has the same length of the upper lever, so that said dome of the first support rotates exactly by the same angle of said roll and steering mechanism.

4. The system according to claim 1, wherein said articulated connection means comprise a first pulley integral with a first support, the first ends of two Bowden cables being connected to said first pulley, and a second pulley connected with the roll and steering mechanism, the remaining ends of said two Bowden cables being connected to said second pulley.

5. The system according to claim 4, wherein the system comprises a pair of plates, respectively integral with the roll and steering mechanism and with the chassis, said pair of plates acting as a stop for the four terminals of said two Bowden cables.

6. The system according to claim 1, wherein said articulated connection means comprise a first pulley integral with a first support, the first ends of two Bowden cables being connected with said first pulley, and an electrical gearmotor having an electronic rotation control, on the outlet axis of which a pulley being mounted, the remaining ends of said two Bowden cables being connected with said pulley.

7. The system according to claim 6, wherein the rotation of the electrical gearmotor is controlled by a control system able to detect the roll angle in a cornering behaviour of the vehicle through one or more sensors.

8. The system according to claim 7, wherein said one or more sensors comprise at least one gyroscope the axis of which is integral with the vertical axis of the vehicle, in order to measure the angular velocity of the chassis, and at least one sensor of the speed of the wheel.

9. The system according to claim 1, wherein said two levers are symmetrically mounted on said rear cylindrical ends of the supports.

10. The system according to claim 9, wherein said tie-push rod is suitably threaded at respective ends, on which two fork-shaped terminals are connected, which permit the connection with said two levers through respective screws acting as an axis for the relative rotation.

11. System according to claim 1, wherein the system comprises a transversal reinforcement plate connected with the supports to prevent possible deformations of the regulation system.

12. System according to claim 1, also comprising one or more additional headlights placed on both right and left sides of the vehicle and suitably angled, which can be alternately actuated in case of great bending or steering angles of said vehicle.

13. System according to claim 12, wherein the system comprises one or more sensors able to estimate the bending angle of the vehicle, the information coming from said sensors being acquired through an electronic unit able to actuate the additional headlights placed on the right or the left side of the vehicle.

14. System according to claim 12, wherein the system comprises two or more sensors which react to the proximity of metal elements, and one or more metal sectors, bound to the roll and steering mechanism, the shape of which is such that the metal sectors are perceived by said two sensors, said two sensors being able to control the actuation of the additional headlights placed on the right or the left side of the vehicle.

15. The system according to claim 14, wherein said two or more sensors are fixed to the chassis through support brackets and are able to control the actuation of the additional headlights just for bending angles of the vehicle greater than a predefined threshold.

16. System according to claim 14, wherein said two or more sensors are integral with the steering tube of the chassis through a clamp and corresponding brackets and are able to control the actuation of the additional headlights just for steering angles of the vehicle greater than a predefined angle.

* * * * *